United States Patent
Hess

(10) Patent No.: US 10,435,151 B2
(45) Date of Patent: Oct. 8, 2019

(54) SYSTEM FOR CONVERTING A SAFEGUARDED FREE FLIGHT ONBOARD BATTERY-POWERED DRONE TO A GROUND-POWERED TETHERED DRONE

(71) Applicant: Kevin Hess, Ponte Vedra Beach, FL (US)

(72) Inventor: Kevin Hess, Ponte Vedra Beach, FL (US)

(73) Assignee: DRONE AFS CORP., Jacksonville, FL (US)

( * ) Notice: Subject to any disclaimer, the term of this patent is extended or adjusted under 35 U.S.C. 154(b) by 156 days.

(21) Appl. No.: 15/832,209

(22) Filed: Dec. 5, 2017

(65) Prior Publication Data
US 2018/0155022 A1    Jun. 7, 2018

Related U.S. Application Data

(60) Provisional application No. 62/430,195, filed on Dec. 5, 2016.

(51) Int. Cl.
*B64C 39/02* (2006.01)

(52) U.S. Cl.
CPC .......... *B64C 39/022* (2013.01); *B64C 39/024* (2013.01); *B64C 2201/042* (2013.01); *B64C 2201/06* (2013.01); *B64C 2201/148* (2013.01)

(58) Field of Classification Search
CPC ................................................. B64C 39/022
See application file for complete search history.

(56) References Cited

U.S. PATENT DOCUMENTS

| | | | |
|---|---|---|---|
| 7,631,834 B1 * | 12/2009 | Johnson | B64C 39/024 244/17.11 |
| 2017/0144754 A1 * | 5/2017 | Limvorapun | B60L 53/54 |
| 2018/0329417 A1 * | 11/2018 | Abuhasira | G05D 1/0077 |

* cited by examiner

*Primary Examiner* — Daniel J Cavallari
(74) *Attorney, Agent, or Firm* — Thomas C. Saitta

(57) ABSTRACT

A system and method for converting onboard battery-powered, free-flight drones into ground-powered tethered drones that overcome the impediments designed into safeguarded free-flight drones. In combination with a ground-sourced power supply for the drone, power being delivered to the drone through a tether, the system comprises a battery emulating module that provides false signals to the drone's battery circuit board such that the onboard batteries may be removed and the alternative ground-based power source utilized without causing the drone's main circuit board to initiate a systems shutdown.

16 Claims, 2 Drawing Sheets

SYSTEM FOR CONVERTING A SAFEGUARDED FREE FLIGHT ONBOARD BATTERY-POWERED DRONE TO A GROUND-POWERED TETHERED DRONE

This application claims the benefit of U.S. Provisional Patent Application Ser. No. 62/430,195, filed Dec. 5, 2016, the disclosure of which is incorporated herein by reference.

BACKGROUND OF THE INVENTION

This invention relates generally to the field of unmanned aerial vehicles, commonly referred to as drones.

The use of drones in commercial or recreational applications has increased dramatically in recent years, primarily due to the development of improved flight and power systems. Drones may be free flying, such that power is supplied by onboard batteries and flight instructions are delivered to the drone through wireless communications, or tethered, such that power and/or flight instructions are delivered through the tether connecting the drone to ground equipment or ground vehicles.

Free flight drones have limited flight duration, since all power is supplied by onboard batteries, typically in the form of multi-cell battery packs. The storage capacity and number of batteries is limited by size and weight restrictions. Often, flight time is limited to about 20 minutes or less, and may be decreased by external factors such as wind, which may reduce flight to less than about 8 minutes. Thus, the use of free flight drones for long time periods requires frequent landing and recharge/replacement of the batteries.

In situations where the drones are relatively stationary when aloft, or where ground vehicles can travel in tandem with moving drones, the use of tethered drones solves the battery problem. In a tethered drone, the primary power supply is located on the ground, either as stationary equipment or on a vehicle. Stationary equipment may comprise one or more large batteries, batteries recharged by a generator, power directly produced by the equipment (AC converted to DC), or power derived from direct connection to a utility grid with conversion to DC. Vehicles may comprise one or more large batteries, batteries recharged by a vehicle-mounted generator, or power directly produced on the vehicle (AC converted to DC). Thus, the flight duration of tethered drones may be dramatically increased in comparison to free flight drones, to the point of being continuous. There is no need to interrupt the operation of the drone in order to recharge onboard batteries.

Because the tethered drones are much more advantageous in many applications, some manufacturers of free flight drones have taken steps to preclude removal or bypassing of the onboard batteries with connection of the operational systems of the drone directly to ground-sourced power in order to convert free flight drones to ground-powered tethered drones. For example, some free flight drone companies provide a closed system with custom software which utilizes encrypted communication between the battery circuit board of the onboard battery pack and the drone main circuit board, the encryption being hash keyed and dynamically generated. The battery circuit board communicates battery condition to the vehicle main board, including authentication messages; monitors battery cell status; charge controls individual cells; and executes logic related to cell use time, overall battery life expectancy, and a number of other statuses. The safeguards prevent operation of the free flight drone if the batteries are removed or if an alternate (ground-based) power source is provided.

It is an object of this invention to provide a system and method for converting free flight drones to tethered drones that overcomes the impediments designed into certain free flight drones, wherein the system allows power to be supplied to the drone from a ground-based power supply through a tether connected to the drone. It is a further object to provide such a system and method wherein drones that are safeguarded against removal of batteries or use of an alternate power supply may be converted. It is a further object to provide such a system and method wherein emulated signals are delivered to the battery circuit board of the drone for communication with the main circuit board, such that the main circuit board believes the drone is being powered by properly charged batteries instead of a ground-based power supply.

BRIEF SUMMARY OF THE INVENTION

The invention is a system and method of converting an onboard battery-powered free flight drones into ground-powered tethered drones and overcomes the safeguard impediments designed into certain free flight drones to prevent substitution of ground power for native onboard battery power. In safeguarded drones powered by battery cell packs, a battery circuit board monitors the battery cells and provides signals, information and authentications to the main circuit board of the drone, often in an encrypted format, that indicate that power is being supplied by onboard battery packs. Upon removal of the onboard battery packs or providing an alternate power source, the main circuit board is programmed to render the drone non-operational.

In combination with a ground-based power supply with power delivered to the drone through a tether, the system comprises a battery emulating module that provides false signals, information and authentications to one of the drone's native battery pack circuit boards, such that the native, i.e., original, battery pack may be removed and replaced with a battery emulating module that allows the ground-based power source to be utilized without causing the main circuit board of the free flight drone to initiate a systems shutdown, the main circuit board of the drone receiving signals from the native battery circuit board incorporated into the battery emulating module which appear to indicate that the drone is still being powered by the now-removed native onboard battery pack.

The battery emulating module comprises a power conversion system and a battery cell emulating system. The power conversion system reduces the voltage received through the tether from the ground-based power supply to the operational voltage required by the drone. The battery cell emulating system is a programmable system that provides false battery cell signals, information and authentications to a native battery circuit board which has been detached from one of the drone's native battery packs and incorporated into the battery emulating module. The native battery circuit board communicates in usual manner with the native main circuit board, such that the native main circuit board of the drone believes the drone is being powered by onboard battery packs instead of a ground-based power supply.

Preferably, the housing for the battery emulating module is structured and sized so as to have an external configuration matching at least the portion of the native drone battery pack housing received in the drone's battery receptacle, such that native drone battery pack may be removed and easily replaced by the battery emulating module in communication with the ground power supply. In circumstances in which air flow produced by the drone's propellers is insufficient to cool the components of the battery emulating module, heat sink structures and dedicated fans may be utilized.

In one sense, the invention is a battery emulating module adapted to convert a free-flight, onboard battery-powered drone into a tethered, ground-powered drone, said drone comprising one or more native battery packs each comprising multiple cells, a native battery circuit board and a native main circuit board, and wherein said drone is safeguarded to prevent operation of said drone if said native battery pack is removed or an alternate source of power is supplied to said drone, the module comprising a power conversion system adapted to reduce voltage received from a ground-based power source supplied through a tether, and a battery cell emulating system adapted to send emulating signals to the native battery circuit board; whereby upon receipt of said emulating signals from said battery cell emulating system, the native battery circuit board is adapted to transmit signals to the native main circuit board indicating that all required conditions are met for standard operation of the drone and that power is being supplied by the one or more native battery packs rather than from the ground-based power source; and furthermore, the module wherein the native battery circuit board is a battery circuit board removed from one of the one or more native battery packs; further comprising a housing, and wherein said power conversion system, said battery cell emulating system and the native battery circuit board are disposed within said housing; wherein said housing comprises an interface for connection of said housing to the drone; further comprising heat transfer structures; further comprising a dedicated fan; and/or further comprising a standby battery adapted to provide power to the drone if the ground-based power source is interrupted.

In another sense, the invention is A safeguarded, free-flight, onboard battery-powered drone converted to a tethered drone, said drone comprising drone operational hardware; a native main circuit board controlling said drone operational hardware; one or more native battery packs, each of said native battery packs comprising multiple cells and a native battery circuit board in communication with said native main circuit board; wherein said drone is safeguarded to prevent operation of said drone if said native battery pack is removed or an alternate source of power is supplied to said drone; a battery emulating module adapted to receive power from a ground-based power source through a tether, said battery emulating module comprising a power conversion system adapted to reduce voltage received from the ground-based power source, and a battery cell emulating system adapted to send emulating signals to one of said native battery circuit boards; whereby upon receipt of said emulating signals from said battery cell emulating system, said one of said native battery circuit boards transmits the required operational signal to said native main circuit board indicating that all required conditions are met for standard operation of said drone and that power is being supplied by said one or more native battery packs rather than from the ground-based power source; and the drone wherein said native battery circuit board is a battery circuit board removed from one of the one or more native battery packs; further comprising a housing, and wherein said power conversion system, said battery cell emulating system and said native battery circuit board are disposed within said housing; wherein said housing comprises an interface for connection of said housing to said drone; further comprising heat transfer structures; further comprising a dedicated fan; further comprising a standby battery adapted to provide power to the drone if the ground-based power source is interrupted.

In still another sense, the invention is a method of converting a free-flight, onboard battery-powered drone into a tethered, ground-powered drone, said drone comprising one or more native battery packs each comprising multiple cells, a native battery circuit board and a native main circuit board, and wherein said drone is safeguarded to prevent operation of said drone if said native battery pack is removed or an alternate source of power is supplied to said drone, the method comprising the steps of identifying and obtaining a free-flight native drone which is to be converted to a tethered drone; removing a native battery pack from the drone; removing the native battery circuit board from the removed native battery pack; analyzing the removed native battery circuit board to determine the required operational signals normally obtained from the native battery cells; providing a battery emulating module comprising a power conversion system and a battery cell emulating system; programming said battery cell emulating system to produce emulated signals necessary to maintain operation of said drone; connecting said native battery circuit board and said battery cell emulating system such that said emulated signals are able to be communicated to said native battery circuit board; connecting a tether to a ground-based power source and to said battery emulating module; delivering power from the ground-based power source to said power conversion system of said battery emulating module; reducing voltage received from the ground-based power source; producing the emulated signals and transmitting the emulated signals to said native battery circuit, such that said native battery circuit board communicates in normal manner to said native main circuit board that all required operational signals are within acceptable parameters for operation of the drone even though the drone is being powered by the ground-based power source; and furthermore the method wherein said battery emulating module comprises a housing, further comprising the steps of:

positioning said native battery circuit board, said battery cell emulating system and said power conversion system within said housing; and mounting said housing on said drone.

DETAILED DESCRIPTION OF THE INVENTION

Figure 1:
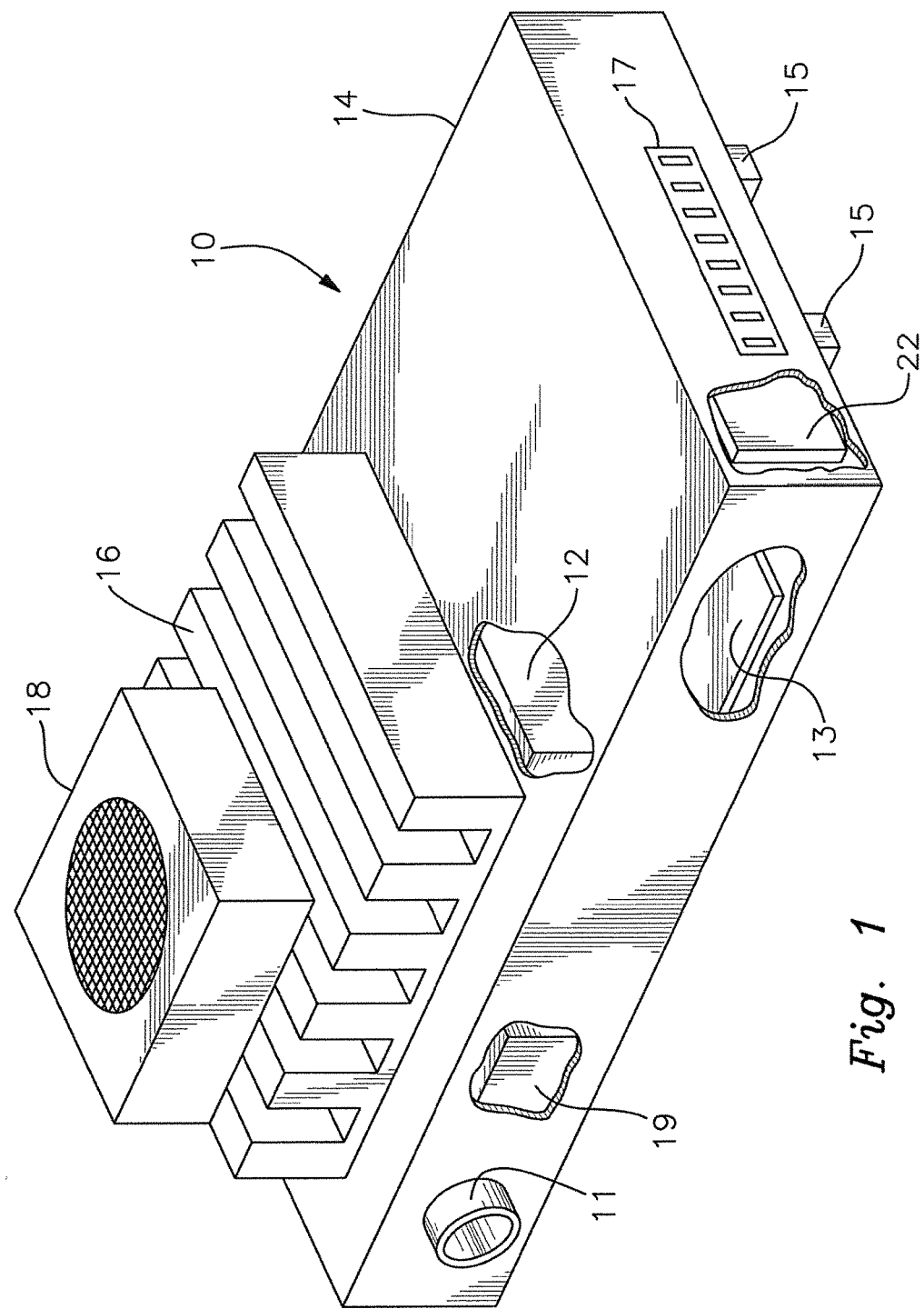
FIG. 1 is a representative illustration of an embodiment of the battery emulating module, partially exposed to show certain internal components FIG. 2 schematically illustrates an embodiment of the combination of the battery emulating system, a normally battery-powered drone, a tether and a ground-based power supply.

With reference to the drawings, which are intended to be illustrative, descriptive and non-limiting as to the scope of the invention, the invention in its embodiments will now be described. The term "native" as used herein in connection with a drone 20 or drone components shall be taken to refer to a free-flight, normally non-tethered, drone 20 having an onboard battery power supply, and in particular to such a drone 20 that incorporates a safeguard system involving software, processors and/or circuit boards that prevent operation of the drone 20 if the onboard battery power supply is removed or made redundant. The term "safeguarded" as used herein shall be taken to refer to a native drone 20 having native systems that preclude operation of the drone 20 in the event the onboard batteries are removed and/or alternate power sources, such as ground-based power sources 40, are used to provide power to the native drone 20. The term "required operational signals" as used herein shall be taken to refer to one or more signals, identifications and authentications received by a native battery circuit board 22 from the onboard batteries which indicate that the drone 20 is being properly powered by the onboard battery power supply. The term "emulated signals" as used herein shall be taken to refer to false or spoofing required operational signals produced by a battery emulating module 10, such false required operational signals being sent to a native battery circuit board 22 normally monitoring a drone's onboard power supply, the nature of the emulated signals being such that the native battery circuit board 22 sends a signal or signals to the native main circuit board 21 that indicates power is being supplied by onboard battery cell packs when in reality power is being supplied to the drone 20 by a ground-based power source 40.

A typical native drone 20 comprises an onboard battery power supply to provide power to the drone's operational hardware, such as motors, propellers, camera, etc. A typical onboard native power supply comprises one or more native battery packs, with each such native battery pack comprising a plurality of individual battery cells. The native battery packs have housings structured to be received by battery pack receptacles on the native drone in a manner that allows for rapid removal and replacement. The native battery packs are provided with native battery circuit boards 22 in communication with a native main circuit board 21. The battery circuit boards 22 monitor, among other things, the status of the individual cells within a native battery pack to insure the cells are sufficiently charged. The status of each cell is transmitted to the native main circuit board 21. In safeguarded drone systems, the main circuit board 21 will require the battery circuit boards 22 to transmit a signal or signals to the main circuit board 21 indicating that all required operational signals, e.g., battery status, battery identification numbers, recharge information, or other battery specific identifiers or authentications have been received by the native battery circuit boards 22. Furthermore, communication between the battery circuit board 22 and main circuit board 21 may be encrypted. In the event the required operational signals are not received, monitored conditions fall outside of acceptable ranges, the battery packs are removed, etc., the battery circuit boards 22 provide this information to the main circuit board 21, which in turn will shut down the operational systems of the drone 20. In similar manner, if power is supplied to the drone 20 by a source other than the onboard battery packs, such that the proper signals are not received from the battery circuit boards 22, the main circuit board 21 will not allow the drone to function.

Unlike free-flight drones 20, a tethered drone or aerostat can be powered by ground-based power sources 40, the power to operate the drone hardware being delivered through the tether 30 restraining the drone. The ground-based power sources 40 allow for significantly greater flight time, as the power may be provided by a larger number of batteries or greater size and weight, a fuel-powered generator, or connection into a utility grid.

For drones 20 that are not safeguarded, providing a ground-based power supply is relatively straightforward, as once the native batteries are disconnected and/or removed, the ground-based power supply system 40 can be directly connected to the native power plug-in port such that power passes to the drone 20 through the tether 30 for operation of the drone's operating systems (e.g., hardware such as propellers, motors, cameras, etc.). However, as set forth above, conversion of safeguarded drones 20 from operation by onboard battery packs to operation by ground-based power sources requires a novel system.

As illustrated in FIG. 1, the conversion system and method for converting a safeguarded native drone 20 powered by onboard battery packs to one which is ground-powered and tethered comprises the combination of a ground-based power supply source 40, a tether 30, and a battery emulating module 10, the battery emulating module 10 being in electronic communication with the native main circuit board 21 of the drone 20 through the native batter circuit board 21, and in power communication with the drone operational hardware 23.

The ground-based power supply 40 may be of various known types, such as for example banks of battery, electrical generators, or utility grids. Tether 30 is of sufficient strength to control the drone 20 and is structured to transmit power as well as communication or other electronic signals to the drone 20, such tethers 30 being known in the art.

Figure 2:
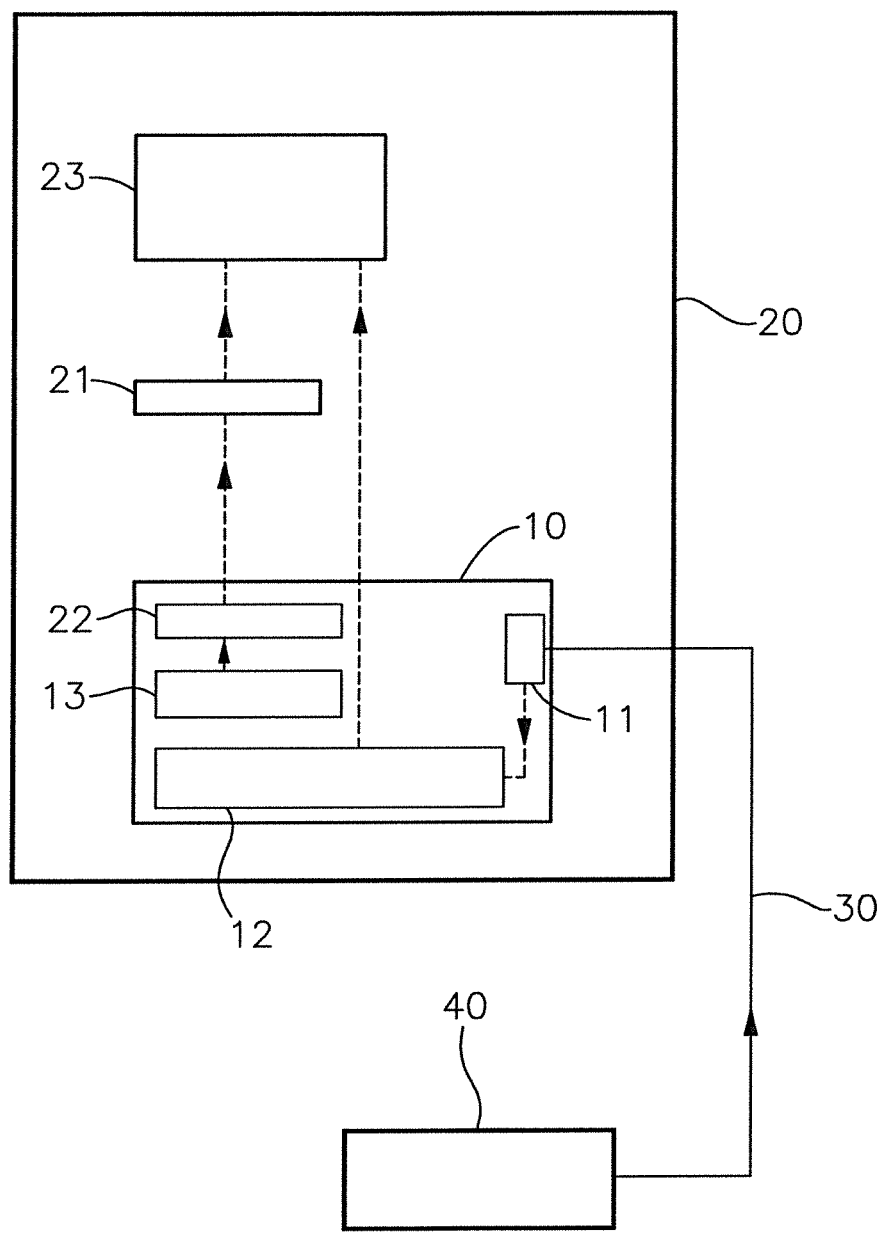

A representative depiction of an embodiment of the battery emulating module 10 is shown in FIG. 2. The battery emulating module 10 comprises a housing 14 preferably configured to match the configuration of the native battery pack of a particular drone 20. Typically, native battery packs are designed to be received by receptacles on the drone 20 in a manner which provides for secure retention with easy insertion or removal, as well as preconfigured couplings for signal and power transmission. For example, the drone battery pack receptacle may be provided with guide slots to insure proper alignment and a body interface. The native battery pack is then provided with guide rails corresponding to the receptacle guide slots and also a pack interface that mates with the receptacle interface. While the battery emulating module 10 could be separately mounted and wired to communicate with the drone 20, it is most preferred that the housing 14 for connection to the drone 20 embodiment just described comprise corresponding guide rails 15 and a pack interface 17, such that with the native battery pack removed the battery emulating module 10 may be inserted into the receptacle in its stead with immediate connection to the drone 20 for transmission of power and electronic signals.

The battery emulating module 10 further comprises a power input 11 connectable to the tether 30 to receive power from the ground-based power supply 40, a power conversion system 12 of known type that reduces the voltage received from the ground-based power supply 40 to the voltage required by the drone 20 (e.g., a reduction from 400 volts to 24 volts), a battery cell emulating system 13, and the native battery circuit board 22 of the removed drone battery pack which is to be replaced with the battery emulating module 10. It is necessary to utilize the drone's native battery circuit board 22 in the battery emulating module 10 as communication with the drone's native main circuit board 21 may be encrypted.

The battery cell emulating system 13 is in communication with the native battery circuit board 22, and comprises programmed circuitry, i.e., a combination of software, processors and/or circuit boards, which produces emulated signals, such as false voltage readings for non-existent battery cells, battery identification information or authentication of the removed battery, and other information which would have been monitored by native battery circuit board 22 when the now-removed native battery pack was in use on the drone 20. For example, the emulated signals may include an imaginary voltage reading at an acceptable value corresponding to each of the cells from the native battery pack, which emulated signals are now provided to the native battery circuit board 22. The number and type of emulated signals required to be produced by the battery cell emulating system 13 are determined by analysis of the native battery cell circuit board 22 to discover the required operational signals. For example, an emulated signal may also tell the now-tethered drone 20 that the removed native battery pack is being charged, which is necessary to avoid logic that sets an arbitrary time limit on the time of flight based on knowledge of the normal capacity of the native battery pack.

In this manner, the native battery circuit board 22 receives emulated signals from the battery cell emulating system 13 that falsely indicate the drone 20 is being powered by the now-removed native battery pack instead of by the ground-based power supply 40 and that all other requirements are met. This false status signal or signals indicating that all required conditions are met for standard operation of the drone 20 are transmitted in normal manner, whether encrypted or non-encrypted, by the native battery circuit board 22 to the native main circuit board 21. Thus, the main circuit board 21 does not perceive that the native battery pack has been removed and that the drone 20 is being powered by a ground-based power source 40, and operation of the drone 20 continues as normal.

Various components in the battery emulating module 10 produce heat or may be adversely affected by elevated temperatures. For some drones 20 the location of the installed battery emulating module 10 is such that air flow from the drone's 20 propellers will effectively reduce the temperature of the battery emulating module 10. In other circumstances, wherein the battery emulating module 10 is mounted such that the body of the drone 20 blocks air flow from sufficiently cooling the battery emulating module 10, a preferred embodiment of the device includes heat sink or heat transfer structures 16, for example ridges, posts or the like made of high temperature transfer metal, and/or a dedicated cooling fan 18 mounted on the housing 14.

In another preferred embodiment, the battery emulating module 10 incorporates a small onboard standby battery 19 that is charged when necessary by the ground-based power supply 40, such that in the event of abrupt power cessation or severe power reduction through the tether 30 to the drone 20, the drone 20 will have sufficient battery capacity to land safely. When current is being drawn from the standby onboard battery, the battery cell emulating system 13 lowers the reported cell voltages reported to the native battery circuit board 22, thereby enabling the drone 20 to perform a fail-safe, low-battery landing.

This conversion system is advantageous in that no permanent alterations or modifications are required in the native drone 20, thereby producing a tethered drone from a native free flight drone 20 at relatively low cost and with no effect on the operational systems of the native drone 20.

The methodology for practicing the invention is to first identify and obtain the free-flight native drone 20 which is to be converted to a tethered drone. A native battery pack is then removed from the drone 20. The battery circuit board 22 is removed from the native battery pack and analyzed in known manner to determine the required operational signals, e.g., charge conditions, identifications, authentications and other information that is normally obtained from the native battery cells. A battery emulating module 10 comprising a power conversion system 12 and a battery cell emulating system 13 is provided. The battery cell emulating system 13 is then programmed to produce emulated signals corresponding to the required operational signals necessary to maintain spoofed operation of the native drone 20. The native battery circuit board 22 and the battery cell emulating system 13 are positioned within the housing 14 and connected such that the emulated signals are able to be communicated to the native battery circuit board 22. Upon connection of the tether 30 to the ground-based power input 11, insertion of the battery emulating module 10 into the drone receptacle, and delivery of power through the tether 30 from the ground-based power source 40, the battery cell emulating system 13 produces the emulated signals and transmits them to the native battery circuit board 22, which receives the emulated signals from the battery cell emulating system 13 and communicates in normal manner to the drone's native main circuit board 21 that all required operational signals, voltages, identifications, authentications and the like are present and within acceptable parameters for operation of the drone 20. The power conversion system 12 reduces the voltage from the ground-based power source 40 and provides power to the drone operational hardware 23. The drone 20 can now remain aloft and operational as long as ground-based power is provided.

It is understood that equivalents and substitutions for certain elements and steps described above may be obvious to those of skill in the art, and therefore the true scope and definition of the invention is to be as set forth in the following claims.

I claim:

1. A battery emulating module adapted to convert a free-flight, onboard battery-powered drone into a tethered, ground-powered drone, said drone comprising one or more native battery packs each comprising multiple cells, a native battery circuit board and a native main circuit board, and wherein said drone is safeguarded to prevent operation of said drone if said native battery pack is removed or an alternate source of power is supplied to said drone, the module comprising:
   a power conversion system adapted to reduce voltage received from a ground-based power source supplied through a tether, and
   a battery cell emulating system adapted to send emulating signals to the native battery circuit board;
   whereby upon receipt of said emulating signals from said battery cell emulating system, the native battery circuit board is adapted to transmit signals to the native main circuit board indicating that all required conditions are met for standard operation of the drone and that power is being supplied by the one or more native battery packs rather than from the ground-based power source.

2. The module of claim 1, wherein the native battery circuit board is a battery circuit board removed from one of the one or more native battery packs.

3. The module of claim 1, further comprising a housing, and wherein said power conversion system, said battery cell emulating system and the native battery circuit board are disposed within said housing.

4. The module of claim 3, wherein said housing comprises an interface for connection of said housing to the drone.

5. The module of claim 3, further comprising heat transfer structures.

6. The module of claim 3, further comprising a dedicated fan.

7. The module of claim 1, further comprising a standby battery adapted to provide power to the drone if the ground-based power source is interrupted.

8. A safeguarded, free-flight, onboard battery-powered drone converted to a tethered drone, said drone comprising:
- drone operational hardware;
- a native main circuit board controlling said drone operational hardware;
- one or more native battery packs, each of said native battery packs comprising multiple cells and a native battery circuit board in communication with said native main circuit board;
- wherein said drone is safeguarded to prevent operation of said drone if said native battery pack is removed or an alternate source of power is supplied to said drone;
- a battery emulating module adapted to receive power from a ground-based power source through a tether, said battery emulating module comprising a power conversion system adapted to reduce voltage received from the ground-based power source, and a battery cell emulating system adapted to send emulating signals to one of said native battery circuit boards;
- whereby upon receipt of said emulating signals from said battery cell emulating system, said one of said native battery circuit boards transmits the required operational signal to said native main circuit board indicating that all required conditions are met for standard operation of said drone and that power is being supplied by said one or more native battery packs rather than from the ground-based power source.

9. The drone of claim 8, wherein said native battery circuit board is a battery circuit board removed from one of the one or more native battery packs.

10. The drone of claim 8, further comprising a housing, and wherein said power conversion system, said battery cell emulating system and said native battery circuit board are disposed within said housing.

11. The drone of claim 10, wherein said housing comprises an interface for connection of said housing to said drone.

12. The drone of claim 10, further comprising heat transfer structures.

13. The drone of claim 10, further comprising a dedicated fan.

14. The drone of claim 8, further comprising a standby battery adapted to provide power to the drone if the ground-based power source is interrupted.

15. A method of converting a free-flight, onboard battery-powered drone into a tethered, ground-powered drone, said drone comprising one or more native battery packs each comprising multiple cells, a native battery circuit board and a native main circuit board, and wherein said drone is safeguarded to prevent operation of said drone if said native battery pack is removed or an alternate source of power is supplied to said drone, the method comprising the steps of:
- identifying and obtaining a free-flight native drone which is to be converted to a tethered drone;
- removing a native battery pack from the drone;
- removing the native battery circuit board from the removed native battery pack;
- analyzing the removed native battery circuit board to determine the required operational signals normally obtained from the native battery cells;
- providing a battery emulating module comprising a power conversion system and a battery cell emulating system;
- programming said battery cell emulating system to produce emulated signals necessary to maintain operation of said drone;
- connecting said native battery circuit board and said battery cell emulating system such that said emulated signals are able to be communicated to said native battery circuit board;
- connecting a tether to a ground-based power source and to said battery emulating module;
- delivering power from the ground-based power source to said power conversion system of said battery emulating module;
- reducing voltage received from the ground-based power source;
- producing the emulated signals and transmitting the emulated signals to said native battery circuit, such that said native battery circuit board communicates in normal manner to said native main circuit board that all required operational signals are within acceptable parameters for operation of the drone even though the drone is being powered by the ground-based power source.

16. The method of claim 15, wherein said battery emulating module comprises a housing, further comprising the steps of:
- positioning said native battery circuit board, said battery cell emulating system and said power conversion system within said housing; and
- mounting said housing on said drone.

* * * * *